(No Model.)

J. GREGG.
ENDLESS ROPE POWER TRANSMISSION.

No. 423,046. Patented Mar. 11, 1890.

WITNESSES:

INVENTOR
John Gregg
BY
E. G. Ewart
ATTORNEY

UNITED STATES PATENT OFFICE.

JOHN GREGG, OF CHICAGO, ILLINOIS, ASSIGNOR TO THE LINK-BELT MACHINERY COMPANY, OF SAME PLACE.

ENDLESS-ROPE POWER-TRANSMISSION.

SPECIFICATION forming part of Letters Patent No. 423,046, dated March 11, 1890.

Application filed October 14, 1889. Serial No. 326,978. (No model.)

*To all whom it may concern:*

Be it known that I, JOHN GREGG, of Chicago, in the county of Cook and State of Illinois, have invented a new and useful Improvement in Endless Rope or Band Transmission of Power; and I do hereby declare that the following is a full, clear, and exact description thereof, reference being had to the accompanying drawings, forming part of this specification.

My invention relates to multiple rope-transmission; and it consists in a novel arrangement of idlers between the driving and driven wheels for changing the direction of the ropes.

The object of my invention is to provide means for connecting, by multiple rope-transmission, shafts which are not parallel, or parallel shafts whose wheels cannot be located in line with each other. I attain this object by the arrangements illustrated in the accompanying drawings, in which—

Figure 1:
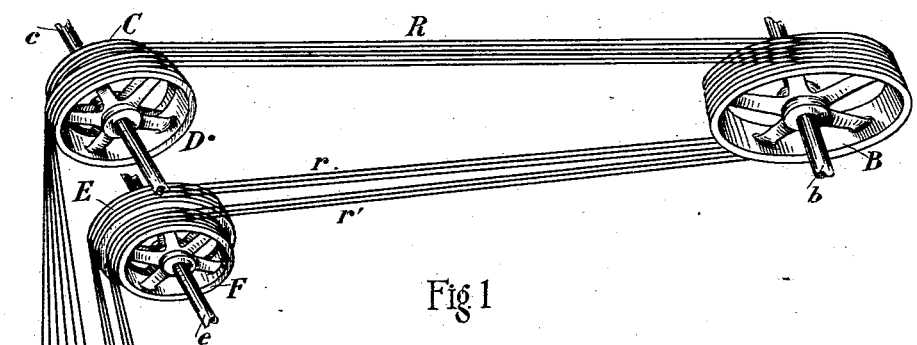
Figure 2:
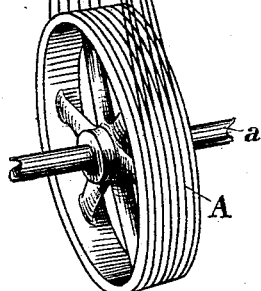
Figure 2:
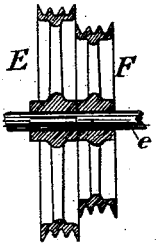
Figure 3:
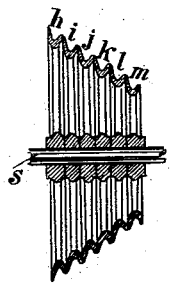
Figure 4:
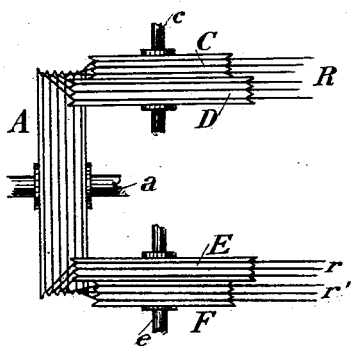

Figure 1 is a perspective view of a rope-drive employing my device. Fig. 3 is a cross-section of a set of idle-wheels arranged to illustrate my invention. Fig. 2 shows a form I have found convenient to use under some circumstances. Fig. 4 is a plan of the left-hand portion of Fig. 1, shown slightly in perspective to illustrate the lead of the ropes.

Similar letters refer to similar parts throughout the several views.

A is the driving-wheel on shaft $a$.

B is the driven wheel on shaft $b$.

C and D are idle-wheels on shaft $c$ for the upper strands of rope R.

E and F are idle-wheels on shaft $e$ for the lower strands of rope $r\ r'$, respectively, E being keyed to the shaft and F running loose on the shaft.

$h\ i\ j\ k\ l\ m$ in Fig. 3 are independently mounted wheels of different diameters on shaft $s$.

In the practice of my invention, where round ropes are used, I make the grooves of the transmission-wheels V-shaped to increase the grip of the ropes on the wheels; but the grooves of the idlers I make preferably U-shaped, thus allowing more freedom for lateral motion of the ropes. If, therefore, I were using the series of idlers $h\ i\ j\ k\ l\ m$ of Fig. 3, in place of the two idlers E and F in Fig. 4, I would so locate them that the lead of the rope off the large idler $h$ would be in line with a tangent to the left-hand groove in transmission-wheel A, and the rope from the small idler $m$ in line with tangent to right-hand groove in wheel A, and the intermediate idlers $i\ j\ k\ l$ in a series of steps to suit the tangents of the corresponding grooves in wheel A, the difference between the pitch-radii of $m$ and $h$ just equaling the distance between the centers of the ropes on the right and left hand grooves of wheel A. The ropes would then lead directly into the V-grooves of the transmission-wheel without friction and chafing against the sides of the grooves, while the lateral freedom allowed by the U-grooves in the idlers would prevent chafing there, even though the ropes must lead off at a greater or less angle from the tangents of the grooves, the center line between the middle idlers $j$ and $k$ being placed in line with a tangent to the middle of the face of the transmission-wheel A.

I have found that where the distances and other circumstances were favorable I could dispense with some of the intermediate steps and for economy use two or more wheels of different diameters having more than one groove, as shown by the use of wheels E and F in Fig. 4. In this case the middle rope of the three at $r$ should lead directly into its groove on wheel A, so that the ropes each side of it may have to run out of line as little as possible.

It is obvious that in using two or more idlers of different diameters on the same shaft they must be independently mounted, so that not more than one, if any, will be fastened tight to the shaft, as they must all revolve at different speeds.

My invention is plainly applicable to any place where the shaft carrying the idlers is not parallel with the shaft next in order in the transmission, whether that shaft carries a transmission-wheel or another set of idlers. It is also evident that the applicability of my invention is not affected by the question whether a tension-carriage and multiple strands of a single rope be used or a number of separate endless ropes are employed on the same wheels without tension-carriages.

Having thus fully described my invention, what I claim as new, and desire to secure by Letters Patent, is—

In a multiple rope-drive for the transmission of power between shafts having stationary bearings, two or more idlers of different diameters independently mounted on an intermediate shaft, substantially as and for the purpose set forth.

JOHN GREGG.

Witnesses:
R. ARDELL,
A. D. DANA.